Patented Dec. 26, 1950

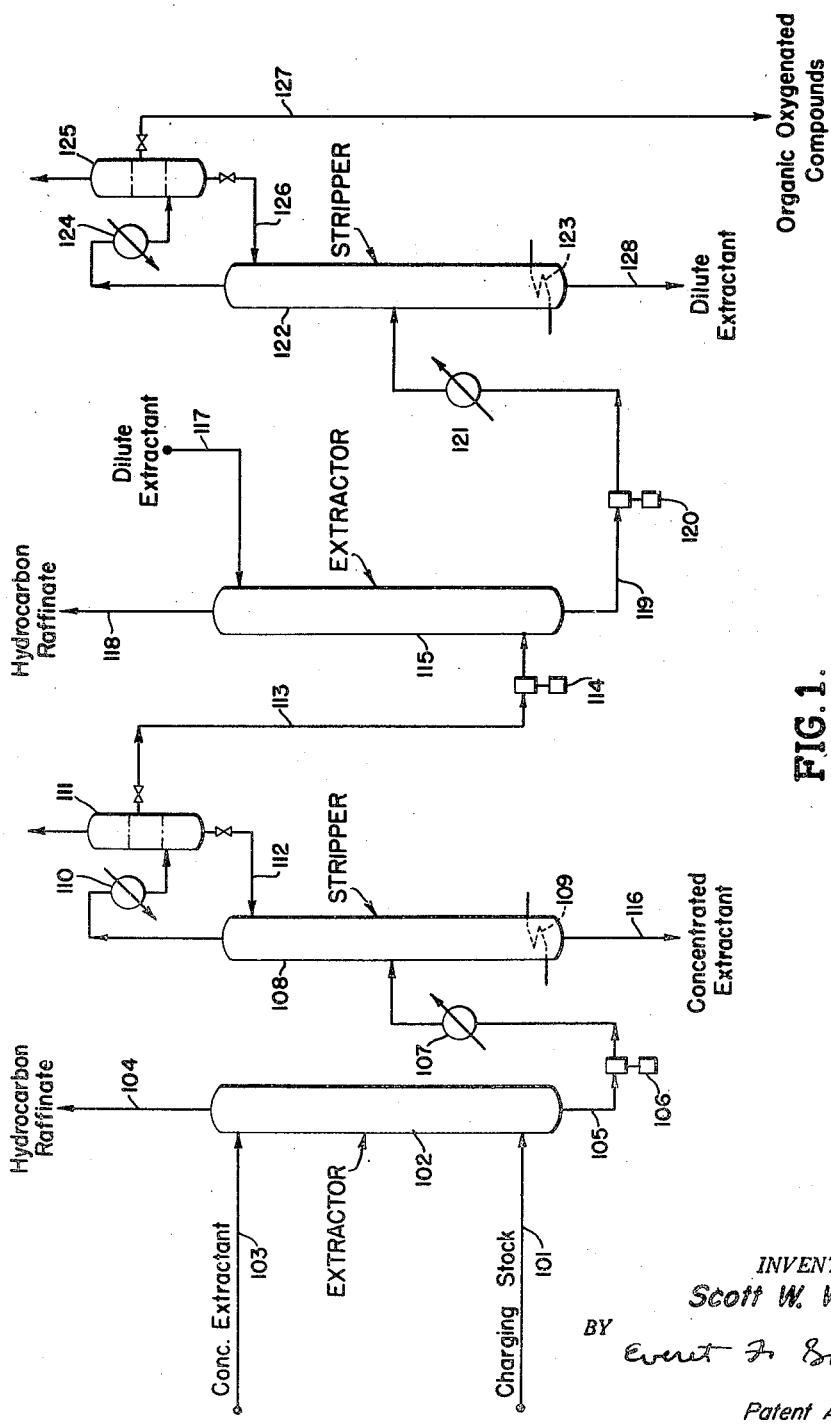

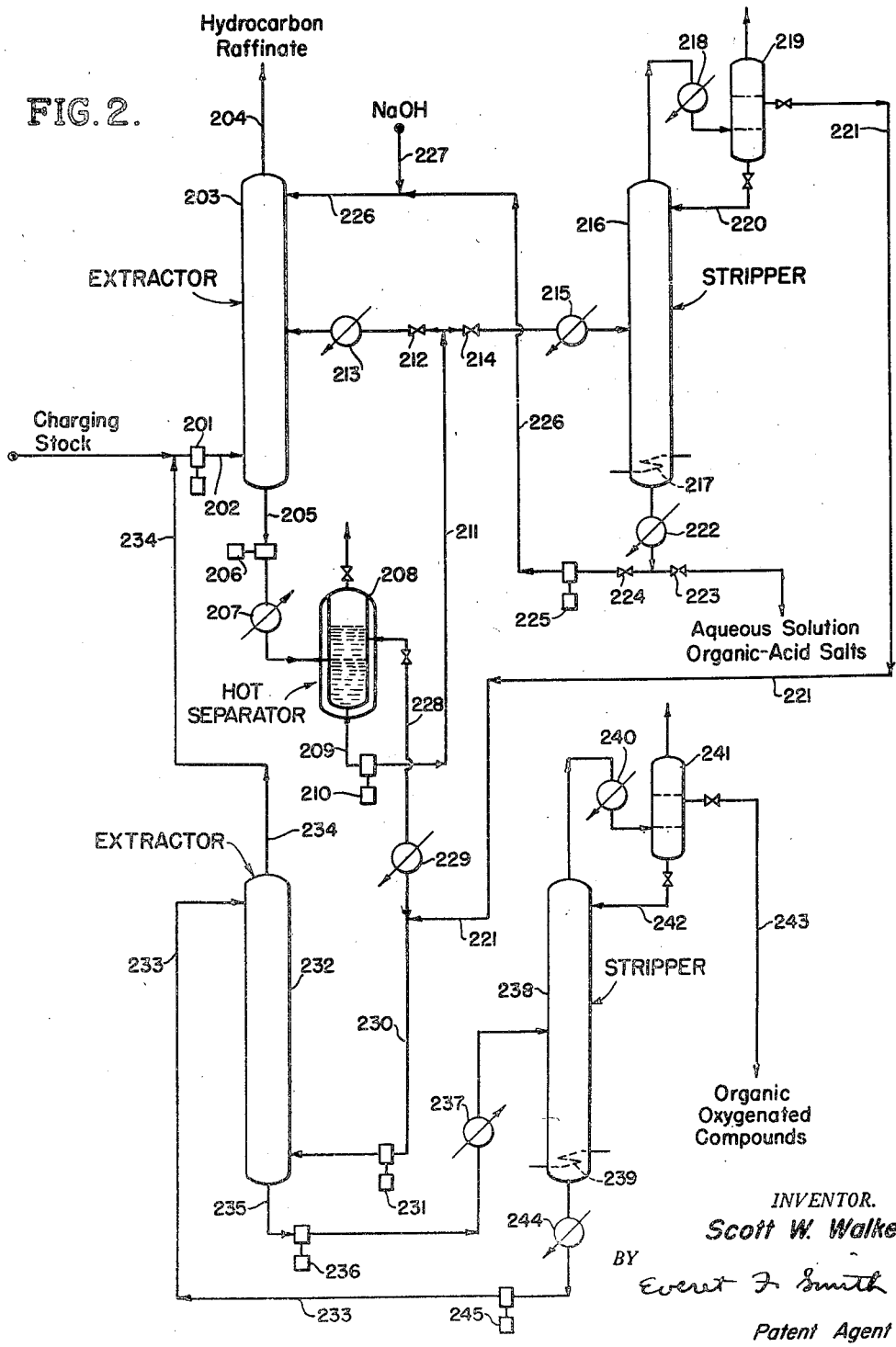

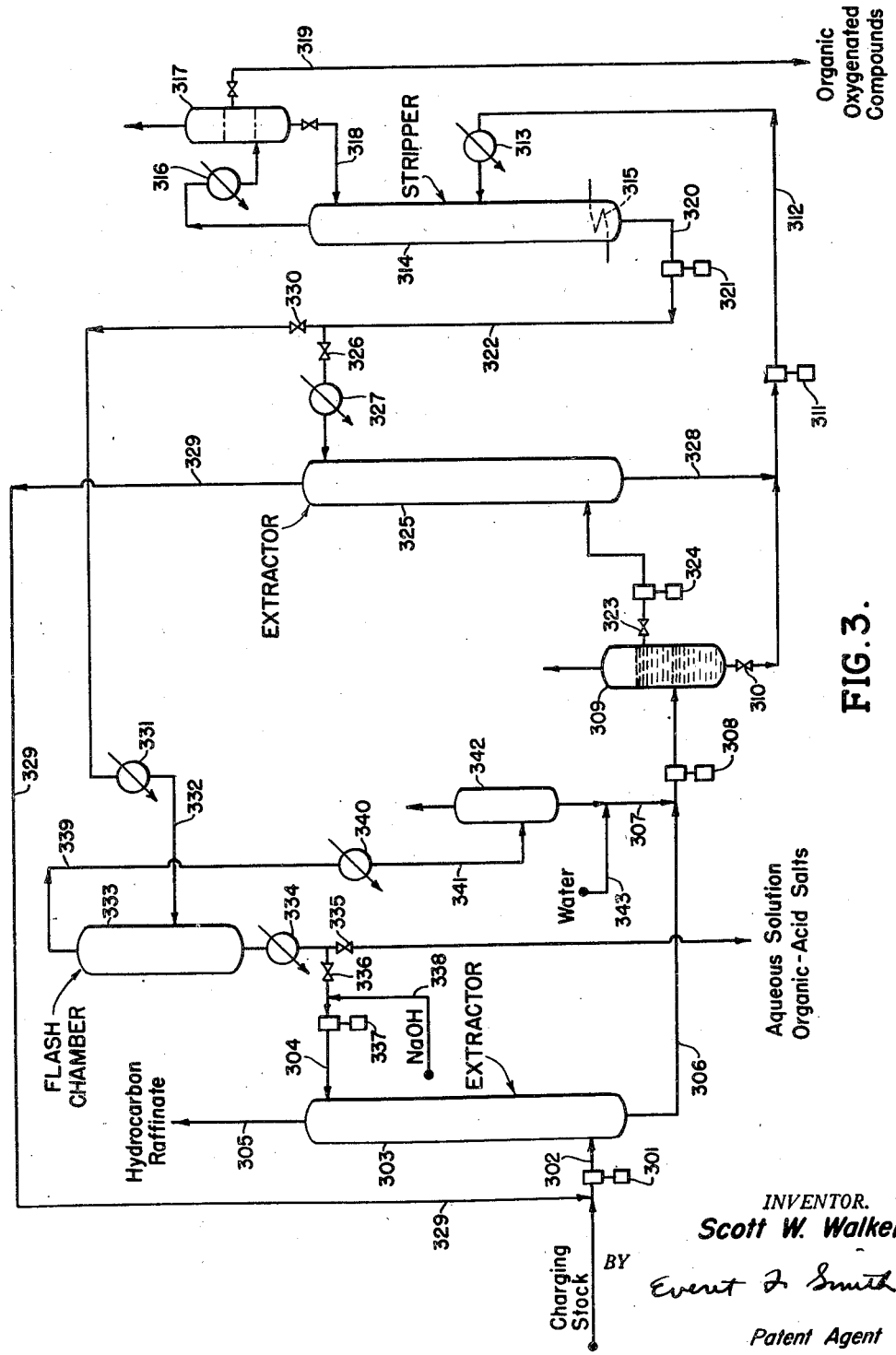

2,535,071

UNITED STATES PATENT OFFICE 2,535,071

SEPARATION OF ORGANIC OXYGENATED COMPOUNDS FROM HYDROCARBONS

Scott W. Walker, Tulsa, Okla., assignor to Stanolind Oil and Gas Company, Tulsa, Okla., a corporation of Delaware Application August 12, 1948, Serial No. 43,947

12 Claims. (Cl. 260—450)

This invention relates to the separation of organic oxygenated compounds from mixtures thereof with hydrocarbons, and more particularly to a method for segregating, separating, and purifying alcohols, aldehydes, and/or ketones from hydrocarbon solutions.

My invention is an improvement in the process for effecting the separation of organic oxygenated compounds from hydrocarbon solutions thereof by extracting the organic oxygenated compounds with an aqueous extractant solution containing a solubilizer selected from the class of compounds consisting of salts and soaps of organic acids. My invention is a combination process wherein the charging stock comprising a hydrocarbon and an organic oxygenated compound is contacted first with a concentrated aqueous extractant solution, which dissolves the greater proportion of the organic oxygenated compound together with a quantity of the hydrocarbon; the resulting aqueous extract is withdrawn and the organic solute comprising the organic oxygenated compound and a quantity of the hydrocarbon is separated therefrom; and the liberated organic solute is subsequently contacted with a comparatively dilute aqueous extractant solution to extract the organic oxygenated compound therefrom, with comparatively little of the hydrocarbon. By means of this combination of steps, preferably in conjunction with certain recycle features to be described below, I am able to separate a high proportion of organic oxygenated compounds from a hydrocarbon solution comprised thereof, and to recover an organic oxygenated compound fraction containing a substantially smaller proportion of hydrocarbon contaminants than may be obtained in the prior-art process referred to above.

My process may be used generally for the separation of organic oxygenated compounds from hydrocarbon solutions thereof, from whatever source derived. Many methods for preparing such mixtures are described in the prior art. Some of the methods produce organic oxygenated compounds in relatively pure condition, or in admixture with impurities which may be separated by conventional means, as in the Oxo process, in which an organic compound containing an olefinic double bond is reacted with carbon monoxide and hydrogen to produce a mixture of aldehydes, alcohols, and unreacted charging stock. Other methods, however, such as the direct oxidation of hydrocarbon liquids and gases, tend to produce mixtures of organic oxygenated compounds and hydrocarbons which are extremely difficult to separate, owing to the heterogeneous nature and similarity of physical and chemical properties of the constituents thereof. Mixtures of similar complexity are produced by the hydrogenation of carbon monoxide by various processes, including the Fischer-Tropsch process, the original German synthol process, and the modern hydrocarbon-synthesis process employing fluidized hydrogenation catalysts.

My process has been found to be particularly advantageous for processing the organic phase resulting from an embodiment of the fluidized-catalyst hydrocarbon-synthesis process in which a reduced, alkali-promoted iron catalyst is employed. Such a process, when operated under the conditions set forth below, produces an organic phase containing up to 40 percent or more of organic oxygenated compounds, including aliphatic aldehydes, aliphatic alcohols, aliphatic ketones, alkanoic acids, and phenols:

| | |
|---|---|
| Catalyst | Iron |
| Promoter | Potassium carbonate |
| Promoter concentration | 0.5 – 2.0 percent by weight |
| Temperature | 550–650° F. |
| Pressure | 100–500 lb./in.$^2$, gage |
| Space velocity | 4–20 cu. ft. CO, measured at 60° F. and 1 atmosphere, per pound of iron per hour |
| CO concentration in feed | 10–20 percent by volume |
| H$_2$:CO ratio in total feed | 1.5–6 |

The hydrocarbon constituents of the organic phase comprise virtually the entire range of saturated and unsaturated hydrocarbons, from methane to high-melting waxes. The organic oxygenated compounds are predominantly of the oil-soluble type, but a substantial proportion of the more water-soluble homologues are also present. The following organic oxygenated compounds, and others, have been shown to be present in such reaction products: acetaldehyde, propionaldehyde, butyraldehyde, isobutyraldehyde, and higher aliphatic aldehydes; acetone, methyl ethyl ketone, methyl n-propyl ketone, methyl n-butyl ketone, and higher aliphatic ketones; methanol, ethanol, n-propyl alcohol, n-butyl alcohol, isobutyl alcohol, n-pentyl alcohol, n-octyl alcohol, and higher aliphatic alcohols; acetic acid, propionic acid, butyric acid, 2-methylbutyric acid, valeric acid, 3-methylvaleric acid, 2-methylhexanoic acid, caprylic acid, capric acid, myristic acid, palmitic acid, stearic acid, and other aliphatic carboxylic acids; esters derivable from the foregoing alcohols and acids, such as methyl acetate, ethyl acetate, ethyl butyrate, and the like; formals, acetals, and ketals derivable from the foregoing aldehydes, ketones, and alcohols; and phenol and higher phenols.

The prior art discloses that organic oxygenated compounds of the group consisting of alcohols, aldehydes, and ketones may conveniently be separated from hydrocarbon solutions thereof by extraction with an aqueous soap solution; and I am aware of an improved process in which the extraction is carried out with an aqueous solution of a salt of a carboxylic acid containing less than twelve carbon atoms in the molecule. I have previously disclosed an improvement on the prior-art process, which comprises effecting the extraction with an aqueous extractant solution containing in excess of about 30 percent by weight of solubilizer, the extraction efficiency being markedly improved thereby. Subsequently, however, it was discovered that concentrated extractant solutions simultaneously dissolve a substantial quantity of hydrocarbons, and the proportion of hydrocarbons to organic oxygenated compounds in the resulting aqueous extract becomes progressively greater in direct proportion to a function of the solubilizer concentration. For example, when the extraction is carried out with an aqueous solution containing 50 to 60 percent by weight of solubilizer, and the operating conditions during the extraction are adjusted so that around 90 percent by volume of the organic oxygenated compounds are removed from the charging stock, the volume of hydrocarbons simultaneously removed may even be somewhat greater than the volume of extracted organic oxygenated compounds. The resulting mixture of organic oxygenated compounds and hydrocarbons, when separated from the aqueous extract, has a greatly improved ratio of organic oxygenated compounds to hydrocarbons, compared with the ratio in the charging stock. However, since the hydrocarbons have boiling points through the entire range of the organic oxygenated compounds, it will be apparent that the further separation and purification of the organic oxygenated compounds cannot be effected in a simple or convenient manner by fractional distillation or other conventional means.

I have now devised a novel combination process giving a high extraction efficiency while minimizing the hydrocarbon contamination of the resulting extract. In a simple embodiment of my invention, a charging stock comprising an organic oxygenated compound and a hydrocarbon is countercurrently contacted with an aqueous extractant solution containing in excess of 30 percent by weight of the defined class of solubilizer salts, and a hydrocarbon raffinate is withdrawn containing a greatly reduced proportion of the organic oxygenated compound. The resulting aqueous extract contains the organic oxygenated compound, heavily contaminated with hydrocarbon. This mixture of organic oxygenated compound and hydrocarbon is stripped out of the extract and is subsequently contacted with a second aqueous extractant solution containing less than 30 percent by weight of the defined class of solubilizer salts. A second hydrocarbon raffinate is withdrawn, containing a substantial proportion of the organic oxygenated compound; and since it is of comparatively small volume, it is conveniently recycled to the initial extraction stage. The second aqueous extract contains the organic oxygenated compound in greatly purified form, contaminated with only a small proportion of hydrocarbon. It is withdrawn and stripped to separate the purified organic oxygenated compound, and the depleted extractant may thereafter be recycled to the second extraction stage.

One object of my invention is to effect the separation and recovery of organic oxygenated compounds from admixture with hydrocarbons. Another object of my invention is to provide a process for recovering organic oxygenated compounds, such as alcohols, aldehydes, ketones, carboxylic acids, and phenolic compounds, from hydrocarbon solutions thereof, such as hydrocarbon solutions resulting from the oxidation of hydrocarbon gases, or from the hydrogenation of oxides of carbon, in particular carbon monoxide. A further object of my invention is to provide a method for effecting the substantially complete extraction of organic oxygenated compounds from hydrocarbon solutions thereof and for producing an aqueous extract containing said organic oxygenated compounds with a minimum proportion of contaminating hydrocarbons. An additional object of my invention is to produce a hydrocarbon product relatively free of oxygenated compounds, and a subsidiary object is to produce a motor fuel of relatively good odor and of improved stability with respect to antiknock rating. Other objects of my invention, and its advantages over the prior art, will be apparent from the following description.

Figure 1 illustrates a simple embodiment of my invention. A charging stock comprising organic oxygenated compounds and hydrocarbons, suitably the organic phase produced by the hydrogenation of carbon monoxide in the presence of a fluidized, alkali-promoted iron catalyst as described above, is introduced through line 101 into the bottom of extraction column 102, where it rises countercurrent to a concentrated aqueous solution, introduced into the top of the column through line 103, of water-soluble salts of carboxylic acids, suitably containing in excess of about 30 percent by weight of such salts, and preferably containing between about 40 and 60 percent by weight of water-soluble salts of a mixture of organic acids such as the mixture contained in the charging stock. Such an aqueous solubilizer solution extracts up to 90 percent or more of the organic oxygenated compounds contained in the charging stock, with the result that the hydrocarbon raffinate emerging from the top of extraction column 102 through line 104 contains a comparatively small percentage of organic oxygenated compounds.

The aqueous extract flowing from the bottom of extraction column 102 through line 105 contains the dissolved organic oxygenated compounds, and in addition a substantial quantity of dissolved hydrocarbons. This extract is transferred by pump 106 through heater 107 into an intermediate section of stripper 108. Within the stripper, the organic oxygenated compounds, the hydrocarbons, and a quantity of water are distilled overhead by reboiler 109 through condenser 110 into separator 111, where two phases are formed. The aqueous phase therein is refluxed to the top of stripper 108 through valved line 112, and the organic phase, comprising predominantly the organic oxygenated compounds and hydrocarbons, is taken off through valved line 113 and is fed by pump 114 into the bottom of extraction column 115. The aqueous extractant solution, now substantially free from organic oxygenated compounds and hydrocarbons, flowing from the bottom of stripper 108 through line 116, may be recycled, suitably to the top of extraction column 102 through line 103.

A dilute aqueous extractant solution, suitably containing less then 30 percent by weight of the defined class of solubilizer salts, and preferably containing between about 5 and 20 percent, is introduced into the top of extraction column 115 through line 117, and is allowed to flow downward countercurrent to the mixture of organic oxygenated compounds and hydrocarbons entering the bottom of the column. The dilute extractant solution dissolves the major portion of the organic oxygenated compounds entering the bottom of the column, while disolving only a comparatively small quantity of hydrocarbons. The hydrocarbon raffinate flowing from the top of extraction column 115 through line 118 ordinarily contains around 25 percent or somewhat more of the organic oxygenated compounds entering the column; the hydrocarbon raffinate is therefore preferably recycled by way of line 101 to extraction column 102, in combination with the initial charging stock.

The aqueous extract leaving extraction column 115 through line 119 is transferred by pump 120 through heater 121 into an intermediate portion of stripper 122. Organic oxygenated compounds are stripped out of this stream by reboiler 123, together with any contaminating hydrocarbons, and the mixture of organic oxygenated compounds, hydrocarbons, and a quantity of water is taken off overhead through condenser 124 into separator 125, where stratification takes place. The aqueous phase in separator 125 is refluxed to the top of stripper 122 through valved line 126, and the organic phase, comprising predominantly organic oxygenated compounds, is withdrawn through valved line 127 to storage or to further processing, suitably to isolate the individual components thereof. A stripped extractant solution flows from the bottom of stripper 122 through line 128, and may be recycled, suitably to the top of extraction column 115 through line 117, preferably after being cooled.

The aqueous extractant solutions employed in my process contain as the major solubilizing constituent a water-soluble salt of a carboxylic acid, such as an alkanoate, a cycloalkanecarboxylate, a benzenecarboxylate or other aromatic carboxylate, or a heterocyclic carboxylate, of an alkali metal, in particular sodium and potassium, or of ammonium or a substituted ammonium. Such salts are to be understood as including both the so-called fatty-acid soaps and the salts of carboxylic acids of lower molecular weight. I prefer, however, to use extractant solutions wherein the solubilizer is a salt of an alkanoic acid containing less than twelve carbon atoms in the molecule, as a means of avoiding emulsification troubles during the extraction procedure. Such salts are substantially non-surface-active, and show little or no tendency to form emulsions under the conditions employed in my process, in contrast to the fatty-acid soaps, such as sodium oleate and sodium stearate. It is unnecessary to exclude surface-active soaps entirely from the aqueous extractant solutions in order to avoid emulsification difficulties, but the solubilizer salts should comprise predominantly the non-surface-active constituents as defined above, and should preferably be composed of around 75 percent or more of such non-surface-active constituents. The salts of various mixtures of organic acids are distinctly superior to salts of single acids; and it is especially advantageous to use salts of the organic acids, including carboxylic acids and phenols, produced by the hydrogenation of carbon monoxide in the prior-art processes. Such mixtures ordinarily consist predominantly of alkanoates, and have an average of less than eleven carbon atoms in the molecule.

The class of substantially non-surface-active carboxylic-acid salts that I prefer to use in the extractant solutions of my process are to be understood as including alkanoates such as acetates, propionates, valerates, caproates, undecanoates, and the like, of the alkali-metals, in particular sodium and potassium, and of ammonium and substituted ammoniums; alkenoates such as acrylates, crotonates, isocrotonates, and the like; alkanedioates such as malonates, adipates, azelates, sebacates, and the like; alkenedioates such as maleates, fumarates, and the like; cycloalkanecarboxylates such as cyclopentanecarboxylates, cyclohexanecarboxylates, and the like; and arylcarboxylates such as benzoates, phthalates, and the like.

I may also incorporate one or more inorganic salts in my extractant solutions, suitably the sulfate, phosphate, chloride, nitrate, iodide, or the like, of a cation chosen from the group set forth above, and suitably in a quantity up to the amount required to saturate the aqueous extractant solution therewith.

In the first extraction step of my process, employing a relatively concentrated extractant solution, the concentration of solubilizer should be above 30 percent by weight, and is preferably between about 40 and 60 percent by weight, although higher concentrations may be used where the extraction conditions are such that the extractant solution is maintained in the liquid phase. In the second extraction step of my process, employing a relatively dilute extractant solution, the concentration of solubilizer therein should be less than 30 percent by weight, and is preferably between about 5 and 20 percent.

The temperatures and pressures employed in the extraction steps of my process are not critical. I may carry out the extractions at temperatures from somewhat below room temperature to as high as 100° C. or above, and at reduced, ordinary, or elevated pressures, so long as the extractant solution and the charging stock remain liquid under the process conditions. Ordinarily, however, I prefer to operate at temperatures between about 20 and 50° C., and at atmospheric or autogenous pressures.

Figure 2 illustrates an advantageous embodiment of my invention, employing a special heat-treatment step to separate from the initial aqueous extract a fraction high in hydrocarbons.

A charging stock comprising organic oxygenated compounds and hydrocarbons is fed by pump 201 through line 202 into the bottom of extraction column 203, and is countercurrently contacted therein with concentrated aqueous extractant solutions, recycled from elsewhere in the process as will be described below, and preferably containing between about 40 and 60 percent by weight of the defined class of solubilizer salts. The greater portion of the organic oxygenated compounds in the charging stock are extracted thereby, and the hydrocarbon raffinate leaving the top of extraction column 203 through line 204 contains only a comparatively small proportion of organic oxygenated compounds.

The aqueous extract emerging from the bottom of extraction column 203 through line 205 contains the extracted organic oxygenated compounds together with a substantial proportion of dissolved hydrocarbons. The stream is transferred by pump 206 into heater 207, where its temperature is raised to around 60° C. or above, and the hot solution is discharged into hot separator 208, where two phases are allowed to form. The organic phase therein contains most of the hydrocarbons that were extracted in extraction column 203, together with a large proportion of the organic oxygenated compounds. The aqueous phase contains a comparatively small proportion of organic oxygenated compounds and hydrocarbons.

The aqueous phase from hot separator 208 flows out through line 209, pump 210, and line 211, and is divided into two streams. One stream flows through valve 212 and cooler 213 into extraction column 203 at an intermediate point, so chosen that the concentration of organic oxygenated compounds in the aqueous phase already present therein is at least as great as the concentration of organic oxygenated compounds in the aqueous stream introduced into the extraction column at such point. In this way, a substantial additional quantity of aqueous extractant solution may be supplied to extraction column 203 without the necessity for any exhaustive stripping of such additional extractant solution. The remainder of the aqueous phase from hot separator 208 flows through valve 214 and heater 215 into an intermediate section of stripper 216. Therein, it is subjected to an exhaustive stripping operation, substantially all organic oxygenated compounds and hydrocarbons being removed therefrom by reboiler 217. The stripped materials are taken overhead together with a quantity of water through condenser 218 into separator 219, where the distillate is allowed to stratify. The resulting aqueous phase is refluxed to the top of stripper 216 through valved line 220, and the organic phase is withdrawn through valved line 221 for further processing, described below.

A clean, concentrated extractant stream emerges from the bottom of stripper 216 through cooler 222, and is divided into two streams. One stream, containing organic-acid salts equivalent to the organic acids contained in the charging stock, is withdrawn through valved line 223 for liberation and recovery of the organic acids by conventional means. The other stream flows through valve 224 into pump 225, and is transferred thereby through line 226 to the top of extraction column 203. Thus, it will be seen that the charging stock is contacted last with an especially purified extractant stream in this embodiment of my invention, so that the maximum removal of organic oxygenated compounds therefrom is attained.

A sufficient quantity of a free base such as sodium hydroxide to react with substantially all of the organic acids in the charging stock is added through line 227 to the clean, concentrated extractant solution in line 226.

The organic phase from hot separator 208 is withdrawn through valved line 228 and cooler 229, and is commingled in line 230 with the organic phase from separator 219, supplied through valved line 221. The mixed organic phases are fed by pump 231 into the bottom of extraction column 232, where they are contacted countercurrently with a dilute extractant stream, introduced into the top of the extraction column through line 233, and preferably containing between about 5 and 20 percent by weight of the defined class of solubilizer salts. The extractant stream removes a major portion of the organic oxygenated compounds contained in the organic stream entering the bottom of extraction column 232; however, the hydrocarbon raffinate stream leaving the top of the extraction column through line 234 retains a substantial proportion of organic oxygenated compounds; it is therefore preferably recycled to extraction column 203 by way of pump 201 and line 202.

The aqueous extract leaving the bottom of extraction column 232 through line 235 is transferred by pump 236 through heater 237 to an intermediate section of stripper 238. Within the stripper, the organic oxygenated compounds are stripped out by reboiler 239 and are distilled overhead, in combination with any contaminating hydrocarbons and a quantity of water, through condenser 240 into separator 241, where phase separation takes place. The aqueous phase in separator 241 is refluxed to the top of the stripper through valved line 242, and the organic phase, comprising predominantly organic oxygenated compounds, is withdrawn through valved line 243 to storage or further processing.

The stripped extractant stream flows out of stripper 238 through cooler 244, and is recycled by pump 245 through line 233 to the top of extraction column 232.

Figure 3 illustrates an embodiment of my process employing a dilution technique for separating an organic phase from the initial aqueous extract.

A charging stock containing organic oxygenated compounds and hydrocarbons is introduced by pump 301 through line 302 into the bottom of extraction column 303, where it is countercurrently contacted with a concentrated aqueous extractant solution, introduced into the top of extraction column 303 through line 304, and preferably containing between about 40 and 60 percent by weight of the defined class of solubilizer salts. The hydrocarbon raffinate emerges from the top of the column through line 305, and the aqueous extract emerges from the bottom of the column through line 306. To the extract, a sufficient quantity of water is added through line 307 to reduce the concentration of solubilizer salts to between about 5 and 20 percent by weight, and the diluted extract is transferred by pump 308 into separator 309, where stratification is allowed to take place. The aqueous phase therein, containing organic oxygenated compounds with a comparatively small proportion of contaminating hydrocarbons, is withdrawn through valved line 310, and is transferred by pump 311 through line 312 and heater 313 into an intermediate section of stripper 314. Within the stripper, the organic oxygenated compounds are distilled overhead by reboiler 315, together with the contaminating hydrocarbons and a quantity of water, and the distillate emerging overhead from stripper 314 is led through condenser 316 into separator 317, where stratification occurs. The aqueous phase from separator 317 is refluxed to the top of stripper 314 through valved line 318, and the organic phase, comprising predominantly organic oxygenated compounds, is withdrawn through valved line 319 to storage or further processing. The stripped, dilute aqueous extractant solution flowing from the bottom of stripper 314 through line 320, pump 321, and line 322 is divided into two streams and further utilized as described below.

The organic phase from separator 309, comprising predominantly hydrocarbons and a substantial proportion of organic oxygenated compounds, is withdrawn through valved line 323 and transferred by pump 324 into the bottom of extraction column 325. Therein, it rises countercurrent to a stream of dilute extractant solution, comprising a portion of the stream flowing from the bottom of stripper 314 through line 320, pump 321, and line 322, and supplied to the top of extraction column 325 through valved line 326 and cooler 327. A substantial proportion of the organic oxygenated compounds in the organic stream entering the bottom of extraction column 325 are dissolved by the extractant solution, and the resulting extract, emerging from the bottom of the column through line 328, is combined with the aqueous solution in valved line 310, which is fed by pump 311 through line 312 and heater 313 into stripper 314. The hydrocarbon raffinate from the top of extraction column 325 still contains a substantial proportion of organic oxygenated compounds; it is therefore recycled by way of line 329, pump 301, and line 302 to the bottom of the primary extraction column 303.

The remainder of the stripped, dilute aqueous extractant solution flowing from the bottom of stripper 314 through line 320, pump 321, and line 322 is led through valved line 330, heater 331, and line 332 into flash chamber 333. The conditions within the flash chamber are so adjusted as to flash off a sufficient quantity of water to produce a liquid phase therein containing the desired concentration of solubilizer salts for introduction into the top of extraction column 303. The liquid phase from the flash chamber is withdrawn through cooler 334, and is divided into two streams. One stream, containing organic-acid salts equivalent to the quantity of organic acids in the charging stock, is withdrawn through valved line 335 for liberation and recovery of the organic acids contained therein by conventional methods. The other stream flows through valved line 336 into pump 337, by which it is introduced through line 304 into the top of extraction column 303. A sufficient quantity of a free base such as sodium hydroxide to react with substantially all of the organic acids in the charging stock is added through line 338 to the stream entering pump 337.

The water vapor leaving flash chamber 333 through line 339 is condensed in cooler 340, and the condensate flows through line 341 into separator 342, from which the liquid phase is withdrawn through line 307 and used to dilute the extract stream flowing from the bottom of extraction column 303. Makeup water is added as required through line 343 to line 307.

The advantages of my invention will be more fully understood from the following specific example:

Example

The following example illustrates the application of my process to an organic phase resulting from the hydrogenation of carbon monoxide in the presence of a fluidized, alkali-promoted iron catalyst. The organic phase was first scrubbed with a dilute solution of sodium hydroxide to remove the greater proportion of the carboxylic acids and phenolic compounds therefrom, and the resulting acid-depleted organic phase was found to have the following composition:

| | |
|---|---|
| Acids | 0.005 N |
| Alcohols | 0.802 moles/liter |
| Total carbonyl compounds | 0.572 moles/liter |
| Aldehydes | 0.438 moles/liter |
| Hydrocarbons | 78 vol. percent |

Two aqueous extractant solutions, containing 50 and 20 percent by weight of sodium organic-acid salts, were prepared by commingling aqueous sodium hydroxide with a mixture of carboxylic acids having a specific gravity (20/4° C.) of 0.9409 and an average molecular weight of 169.4, isolated from the wash liquor obtained by caustic-scrubbing an organic phase of the type described above.

Three liters of the caustic-washed organic phase were extracted five times at room temperature with successive 500 milliliter portions of the aqueous 50 percent by weight extractant solution, and the resulting aqueous extracts were individually steam distilled to separate therefrom the dissolved organic materials, other than the organic-acid salts. The final raffinate phase was washed three times with 300-milliliter portions of water. The results were as follows:

| Extraction No. | Aqueous Extract Phase | Distillate Organic Phase | Raffinate |
|---|---|---|---|
| | Ml. | Ml. | Ml. |
| 1 | 1,236 | 655 | |
| 2 | 700 | 184 | |
| 3 | 620 | 145 | |
| 4 | 563 | 100 | |
| 5 | 555 | 62 | |
| Total | | 1,130 | |
| Final | | | 1,732 |

The final raffinate and the combined distillate organic phases were analyzed, with the following results:

| | Raffinate | Combined Distillate Organic Phases |
|---|---|---|
| Alcohols, moles/liter | 0.063 | 1.870 |
| Total carbonyl compounds, moles/liter | 0.322 | 0.866 |
| Aldehydes, moles/liter | 0.228 | 0.544 |
| Hydrocarbons, vol. percent | 84 | 67 |

Thereafter, 1030 milliliters of the combined distillate organic phases were extracted at room temperature with eight successive 172-milliliter portions of the aqueous 20 percent extractant solution. After each extraction, 30 milliliters of the raffinate phase were withdrawn for analysis, and the succeeding extraction was carried out on the remainder of the raffinate phase. The resulting aqueous extracts were steam distilled as described above. The results were as follows:

| Extraction No. | Aqueous Extract Phase | Distillate Organic Phase | Raffinate |
|---|---|---|---|
| | Ml. | Ml. | Ml. |
| 1 | 228 | 47 | 983 |
| 2 | 233 | 59 | 894 |
| 3 | 220 | 46 | 818 |
| 4 | 220 | 45 | 743 |
| 5 | 211 | 38 | 675 |
| 6 | 216 | 37 | 608 |
| 7 | 200 | 27 | 551 |
| 8 | 198 | 24 | 497 |

The individual distillate organic phases and raffinate phases were analyzed, with the following results:

DISTILLATE ORGANIC PHASES

| Extraction No. | Alcohols Moles/liter | Total Carbonyl Compounds Moles/liter | Aldehydes Moles/liter | Hydrocarbons Vol. percent |
|---|---|---|---|---|
| 1 | 4.43 | 1.20 | 0.45 | 38 |
| 2 | 4.20 | 1.17 | 0.36 | 40 |
| 3 | 4.09 | 1.17 | 0.33 | 40 |
| 4 | 4.06 | 1.16 | 0.37 | 40 |
| 5 | 3.94 | 1.21 | 0.37 | 41 |
| 6 | 3.64 | 1.20 | 0.43 | 43 |
| 7 | | 1.17 | 0.45 | 38 |
| 8 | 3.98 | 1.22 | 0.45 | 41 |

RAFFINATES

| | | | | |
|---|---|---|---|---|
| 1 | 1.634 | 0.640 | | 70 |
| 2 | 1.447 | 0.632 | | 71 |
| 3 | 1.362 | 0.622 | | 74 |
| 4 | 1.340 | 0.610 | | 75 |
| 5 | 1.191 | 0.586 | | 79 |
| 6 | 0.924 | 0.564 | | 82 |
| 7 | 0.773 | 0.550 | | 82 |
| 8 | 0.613 | 0.546 | | 82 |

While the foregoing flowsheets and example illustrate advantageous embodiments of my invention, it is to be understood that I am not limited to the charging stocks, process materials, apparatus and arrangements thereof, and manipulative steps described therein. My process is applicable broadly to the processing of mixtures of hydrocarbons with organic oxygenated compounds, utilizing aqueous solutions of my defined class of solubilizer salts, and it is to be understood that my invention contemplates the utilization of any of the conventional types of apparatus and equipment for effecting the extraction, scrubbing, washing, stripping, fractionating, concentrating, and other unit operations used or useful in my process together with control instruments and equipment therefor. It will be apparent, moreover, that while I prefer to effect the various operations of my process in a continuous manner, I may also operate batchwise or semicontinuously; and many other modifications in the details of my process may be made without departing from the spirit thereof, as defined in the description and the claims. In general, it may be said that any modifications or equivalents that would ordinarily occur to those skilled in the art are to be considered as lying within the scope of my invention.

In accordance with the foregoing description, I claim as my invention:

1. In a process for separating a preferentially oil soluble organic oxygenated compound selected from the group consisting of alcohols, aldehydes, and ketones from a solution thereof comprising predominantly hydrocarbons, the steps which comprise contacting said hydrocarbon solution with a first aqueous extractant solution containing above 30 percent by weight of a substantially non-surface-active salt of a preferentially oil-soluble carboxylic acid, withdrawing a first aqueous extract phase containing said organic oxygenated compound and a hydrocarbon, separating from said first aqueous extract phase an organic mixture consisting essentially of said organic oxygenated compound and said hydrocarbon, contacting said organic mixture with a second aqueous extractant solution containing less than 30 percent by weight of a substantially non-surface-active salt of a preferentially oil-soluble carboxylic acid, withdrawing a second aqueous extract phase containing said organic oxygenated compound in increased ratio to said hydrocarbon, and separating said organic oxygenated compound from said second aqueous extract phase.

2. The process of claim 1 wherein said first aqueous extractant solution contains between about 40 and 60 percent by weight of said salt.

3. The process of claim 1 wherein said second aqueous extractant solution contains between about 5 and 20 percent by weight of said salt.

4. The process of claim 1 wherein said substantially non-surface-active salt is a water-soluble salt of a preferentially oil-soluble aliphatic carboxylic acid.

5. The process of claim 4 wherein said salt is an alkali-metal alkanoate.

6. The process of claim 1 wherein said predominantly hydrocarbon solution and said organic mixture are contacted with said aqueous extractant solutions at temperatures between about 20 and 50° C.

7. In a process for separating a preferentially oil-soluble organic oxygenated compound selected from the group consisting of alcohols, aldehydes, and ketones from a solution thereof comprising predominantly hydrocarbons, the steps which comprise contacting said hydrocarbon solution with a first aqueous extractant solution containing above 30 percent by weight of substantially non-surface-active salts of a mixture of preferentially oil-soluble carboxylic acids, withdrawing a first aqueous extract phase containing said organic oxygenated compound and a hydrocarbon, separating from said first aqueous extract phase an organic mixture consisting essentially of said organic oxygenated compound and said hydrocarbon, contacting said organic mixture with a second aqueous extractant solution containing less than 30 percent by weight of substantially non-surface-active salts of a mixture of preferentially oil-soluble carboxylic acids, withdrawing a second aqueous extract phase containing said organic oxygenated compound in increased ratio to said hydrocarbon, and separating said organic oxygenated compound from said second aqueous extract phase.

8. The process of claim 7 wherein said oil-soluble carboxylic acids contain an average of less than eleven carbon atoms per molecule.

9. In a process for separating a preferentially oil-soluble organic oxygenated compound selected from the group consisting of alcohols, aldehydes, and ketones from a solution thereof comprising predominantly hydrocarbons, the steps which comprise contacting said hydrocarbon solution in a first extraction zone with a first aqueous extractant solution containing above 30 percent by weight of a substantially non-surface-active salt of a preferentially oil-soluble carboxylic acid; withdrawing a first aqueous extract containing said organic oxygenated compound and a hydrocarbon, and a first hydrocarbon raffinate phase substantially depleted of said organic oxygenated compound; separating from said first aqueous extract phase an organic mixture consisting essentially of said organic oxygenated compound and said hydrocarbon; recycling the resulting regenerated aqueous extractant solution to said first extraction zone; contacting said organic mixture with a second aqueous extractant solution containing less than 30 percent by weight of a substantially non-surface-active salt of a preferentially oil-soluble carboxylic acid; withdrawing a second hydrocarbon raffinate phase containing a substantial proportion of said organic oxygenated compound, and a second aqueous extract phase containing said organic oxygenated compound in increased ratio to said hydrocarbon; recycling said second hydrocarbon raffinate phase to said first extraction zone; separating said organic oxygenated compound from said second aqueous extract phase; and recycling the resulting regenerated aqueous extractant solution to said second extraction zone.

10. In a process for separating a preferentially oil-soluble organic oxygenated compound selected from the group consisting of alcohols, aldehydes, and ketones from a solution thereof comprising predominantly hydrocarbons, the steps which comprise contacting said hydrocarbon solution in a first extraction zone with a first aqueous extractant solution containing above 30 percent by weight of a substantially non-surface-active salt of a preferentially oil-soluble carboxylic acid; withdrawing a first aqueous extract phase containing said organic oxygenated compound and a hydrocarbon, and a first hydrocarbon raffinate phase substantially depleted of said organic oxygenated compound; diluting said first aqueous extract phase with water and separating therefrom a first dilute aqueous extract phase, and an organic phase containing predominantly said hydrocarbon; contacting said organic phase in a second extraction zone with a second aqueous extractant solution containing less than 30 percent by weight of a substantially non-surface-active salt of a preferentially oil-soluble carboxylic acid; withdrawing a second hydrocarbon raffinate phase containing a substantial proportion of said organic oxygenated compound; recycling said second hydrocarbon raffinate phase to said first extraction zone; withdrawing from said second extraction zone a second dilute aqueous extract phase; combining said first and said second dilute aqueous extract phases and separating said organic oxygenated compound therefrom; recycling a portion of the resulting regenerated dilute aqueous extractant solution to said second extraction zone; removing water from another portion of said regenerated dilute aqueous extractant solution; and recycling the resulting concentrated aqueous extractant solution to said first extraction zone.

11. In a process for separating a preferentially oil-soluble organic oxygenated compound selected from the group consisting of alcohols, aldehydes, and ketones from a solution thereof comprising predominantly hydrocarbons, the steps which comprise contacting said hydrocarbon solution in a first extraction zone with a first aqueous extractant solution containing above 30 percent by weight of a substantially non-surface-active salt of a preferentially oil-soluble carboxylic acid; withdrawing a first aqueous extract phase containing said organic oxygenated compound and a hydrocarbon, and a first hydrocarbon raffinate phase substantially depleted of said organic oxygenated compound; heating said first aqueous extract phase to an elevated temperature sufficient to cause stratification of a rich organic phase containing said organic oxygenated compound and said hydrocarbon, and a second aqueous extract phase; withdrawing said second aqueous extract phase and separating therefrom an organic mixture comprising said organic oxygenated compound and said hydrocarbon; recycling the resulting regenerated aqueous extractant solution to said first extraction zone; combining and contacting said rich organic phase and said organic mixture in a second extraction zone with a second aqueous extractant solution containing less than 30 percent by weight of a substantially non-surface-active salt of a preferentially oil-soluble carboxylic acid; withdrawing therefrom a second hydrocarbon raffinate phase containing a substantial proportion of said organic oxygenated compound; recycling said second hydrocarbon raffinate phase to said first extraction zone; withdrawing from said second extraction zone a third aqueous extract phase containing said organic oxygenated compound in increased ratio to said hydrocarbon; separating said organic oxygenated compound from said third aqueous extract phase; and recycling the resulting regenerated aqueous extractant solution to said second extraction zone.

12. In a process for separating preferentially oil-soluble alcohols, aldehydes, and ketones from a solution thereof comprising predominantly hydrocarbons, the steps which comprise contacting said solution with a first aqueous extractant solution containing above 30 percent by weight of a substantially non-surface-active salt of a preferentially oil-soluble carboxylic acid, withdrawing a first aqueous extract phase containing said alcohols, aldehydes, and ketones in increased ratio to said hydrocarbons, separating from said first aqueous extract phase an organic mixture consisting essentially of said alcohols, aldehydes, ketones, and hydrocarbons, contacting said organic mixture with a second aqueous extractant solution containing less than 30 percent by weight of a substantially non-surface-active salt of a preferentially oil-soluble carboxylic acid, withdrawing a second aqueous extract phase containing said alcohols, aldehydes, and ketones in further increased ratio to said hydrocarbons, and separating said alcohols, aldehydes, and ketones from said second aqueous extract phase.

SCOTT W. WALKER.

REFERENCES CITED

The following references are of record in the file of this patent:

UNITED STATES PATENTS

| Number | Name | Date |
|---|---|---|
| 2,114,524 | Egli | Apr. 19, 1938 |
| 2,274,750 | Soenksen et al. | Mar. 3, 1942 |